United States Patent [19]

Dittmann, Jr.

[11] Patent Number: 4,523,491
[45] Date of Patent: Jun. 18, 1985

[54] MOTORCYCLE TRANSMISSION FEATURING REVERSE GEAR

[75] Inventor: Fred M. Dittmann, Jr., Lake Zurich, Ill.

[73] Assignee: Municipal Industries, Inc., Chicago, Ill.

[21] Appl. No.: 396,642

[22] Filed: Jul. 9, 1982

[51] Int. Cl.³ .............................................. F16H 3/08
[52] U.S. Cl. ........................................ 74/360; 74/333
[58] Field of Search ................. 74/357, 360, 361, 333, 74/474; 192/21; 340/70

[56] References Cited

U.S. PATENT DOCUMENTS

| | | | |
|---|---|---|---|
| 1,166,656 | 1/1916 | Brimson | 74/357 |
| 4,136,575 | 1/1979 | Labat | 74/360 X |
| 4,449,602 | 5/1984 | Dittmann, Jr. | 180/215 |

FOREIGN PATENT DOCUMENTS

| | | | |
|---|---|---|---|
| 2914883 | 10/1980 | Fed. Rep. of Germany | 74/333 |
| 2031076 | 4/1980 | United Kingdom | 74/360 |

Primary Examiner—George H. Krizmanich
Assistant Examiner—Dirk Wright
Attorney, Agent, or Firm—Jacques M. Dulin, Ltd.

[57] ABSTRACT

The invention provides a constant mesh reverse gear operable by a standard rotary shift drum and fork system which is located within the engine casing along with from 3-5 forward gears of the motorcycle transmission. The reverse gear is mounted on the countershaft and engages an idler mounted on its own separate shaft in engagement with a main shaft reverse gear. The idler pin is secured between a pair of plates mounted on the transmission endplate. These plates also have apertures therein to receive the main shaft and countershaft. A standard toe-operated shift lever engages a shift arm which in turn engages a pawl and cam plate assembly for rotating the rotary shift drum. The shift forks are operated by pins riding in cam grooves on the rotary shift drum. An indicator plate on the cam plate assembly contains a contact boss. The contact boss engages electrical contacts in the rear of the engine casing so that the engagement of the transmission in reverse gear may be positively indicated. In turn, these contacts activate both a back-up beeper and back-up lights so that both the rider and pedestrians will be aware that the machine is in reverse gear, ready to be backed up. In the preferred embodiment shown, four forward gears, neutral and reverse, are provided.

26 Claims, 9 Drawing Figures

MOTORCYCLE TRANSMISSION FEATURING REVERSE GEAR

CROSS REFERENCES TO RELATED APPLICATIONS

The gear train of this invention may be employed in a three-wheel motorcycle featuring a rear storage box of the type shown in my co-pending application. Ser. No. 396,639, now U.S. Pat. No. 4,449,602, issued May 22, 1984, filed of even date herewith. The disclosure of that application is incorporated by reference herein.

BACKGROUND OF THE INVENTION

1. Field of the Invention

This invention relates to motorcycle transmissions in general, and more specifically to the provision of a special reverse gear for motorcycles which is part of the power train as compared to being an independent reverse gear setup.

2. Description of the Prior Art

Two-wheel motorcycles do not have reverse gears as the cycles are sufficiently light weight that the rider can wheel them backward by hand. For larger cycles, this involves the rider dismounting and balancing the cycle while he or she attempts to move the cycle backward. This is extremely difficult, if not impossible, when a cycle has to be backed upgrade or the back wheel moved over a curb.

For emergency or police vehicles, such as three-wheel police-type motorcycles having two rear wheels with a box mounted therebetween, the lack of a rear gear is extremely serious. A polic vehicle, in particular, requires rapid maneuverability. In many situations, it is impractical for the police officer to dismount and to try to push the vehicle backward. In other instances it would be unsafe to the officer, or there would not be enough time. In addition, the added weight of a three-wheel vehicle makes it difficult to move by hand, although such vehicles are more stable than the two-wheel vehicles.

In the older Harley Davidson three-wheel police motorcycles, a reverse gear was provided. However, the Harley was not an in-unit transmission. The Harley engine drove a chain to a separate transmission which in turn drove a chain powering the rear axle. The Harley transmission was not a constant mesh transmission and employed a cam plate with forks for the shifting.

More recently, the "Trident" brand three-wheel police vehicle manufactured by KVV Enterprises, Inc. of Cincinnati, Ohio, offers a reverse feature. However, the "Trident" vehicle employs a snowmobile starter motor powered by a secondary alternator and battery system which is separate from the regular engine alternator and battery. A flywheel is provided on the differential, and the starter motor mounted beneath the tricycle seat engages it for movement of the cycle in reverse after it has been shifted to neutral. The operation is similar to the motion of an automobile when it is left in gear and the starter switch is turned. Such a vehicle moves slowly in a lurching motion. The "Trident" vehicle behaves similarly.

Accordingly, there is a need for provision of a reverse gear mounted integrally in association with a motorcycle engine that can operate in mechanical compatibility with the ordinary motorcycle shifting mechanism, and which provides rapid shifting with full engine power.

THE INVENTION

Objects of the Invention

It is among the objects of this invention to provide a reverse gear for motorcycle engines which is particularly useful for three-wheel police and emergency-type vehicles.

It is another object of this invention to provide a reverse gearing for motorcycle engined which has associated therewith contacts which can signal that the transmission is engaged in the reverse gear and provide audible and visible warnings that the vehicle is backing up.

It is another object of this invention to provide a constant mesh reverse gear which is located within the engine casing.

It is another object of this invention to provide a motorcycle reverse gear which is capable of supplying full engine power.

It is another object of this invention to provide a reverse gear for motorcycles which is in mechanically synchronous combination with the other gears, and which can be operated by conventional rotary shift drums and forks.

Still further and other objects of the invention will become evident from the description which follows.

Summary of the Invention

The invention provides a constant mesh reverse gear operable by a standard rotary shift drum and fork system which is located within the engine casing along with from 3-5 forward gears of the motorcycle transmission. The reverse gear is mounted on the countershaft and engages an idler mounted on its own separate shaft in engagement with a main shaft reverse gear. The idler pin is secured between a pair of plates mounted on the transmission endplate. These plates also have apertures therein to receive the main shaft and counter shaft. A standard toe-operated shift lever engages a shift arm which in turn engages a pawl and cam plate assembly for rotating the rotary shift drum. The shift forks are operated by pins riding in cam grooves on the rotary shift drum. An indictor plate on the cam plate assembly contains a contact boss. The contact boss engages electrical contacts in the rear of the engine casing so that the engagement of the transmission in reverse gear may be positively indicated. In turn, these contacts activate both a back-up beeper and back-up lights so that both the rider and pedestrians will be aware that the machine is in reverse gear, ready to be backed up. In the preferred embodiment shown, four forward gears, neutral and reverse, are provided.

BRIEF DESCRIPTION OF THE DRAWINGS

The detailed description below will have reference to the drawings in which.

DETAILED DESCRIPTION OF THE PREFERRED EMBODIMENT

The preferred embodiment of the invention is described below in detail as representative of the principles of the invention, and not by way of limitation thereof. The specific example will be by reference to modification of a Honda 497cc engine in accordance with the principles of this invention to provide the reverse gear as a replacement for the original first gear of the Honda. The Honda second gear becomes first gear in this invention, third becomes second, and so on through the original fifth gear becoming fourth gear. I have employed another second gear plus an idler gear in a special arrangement to provide the reverse after removing the original first gear. In order to compensate for the loss of the first gear, I have lowered the rear end so it ranges from 3.78 to 5.17 as compared to the original of 3.09. As compared to the "Trident," I have only added a few ounces of weight in plates, idler gear and pin to provide a full, engine-powered reverse, and have eliminated the use of a separate starter motor, flywheel, alternator, and battery system. The approximately 200 lbs reduction in weight as compared to the "Trident" not only improves responsiveness, but also gas mileage and is far simpler to service.

Figure 1:
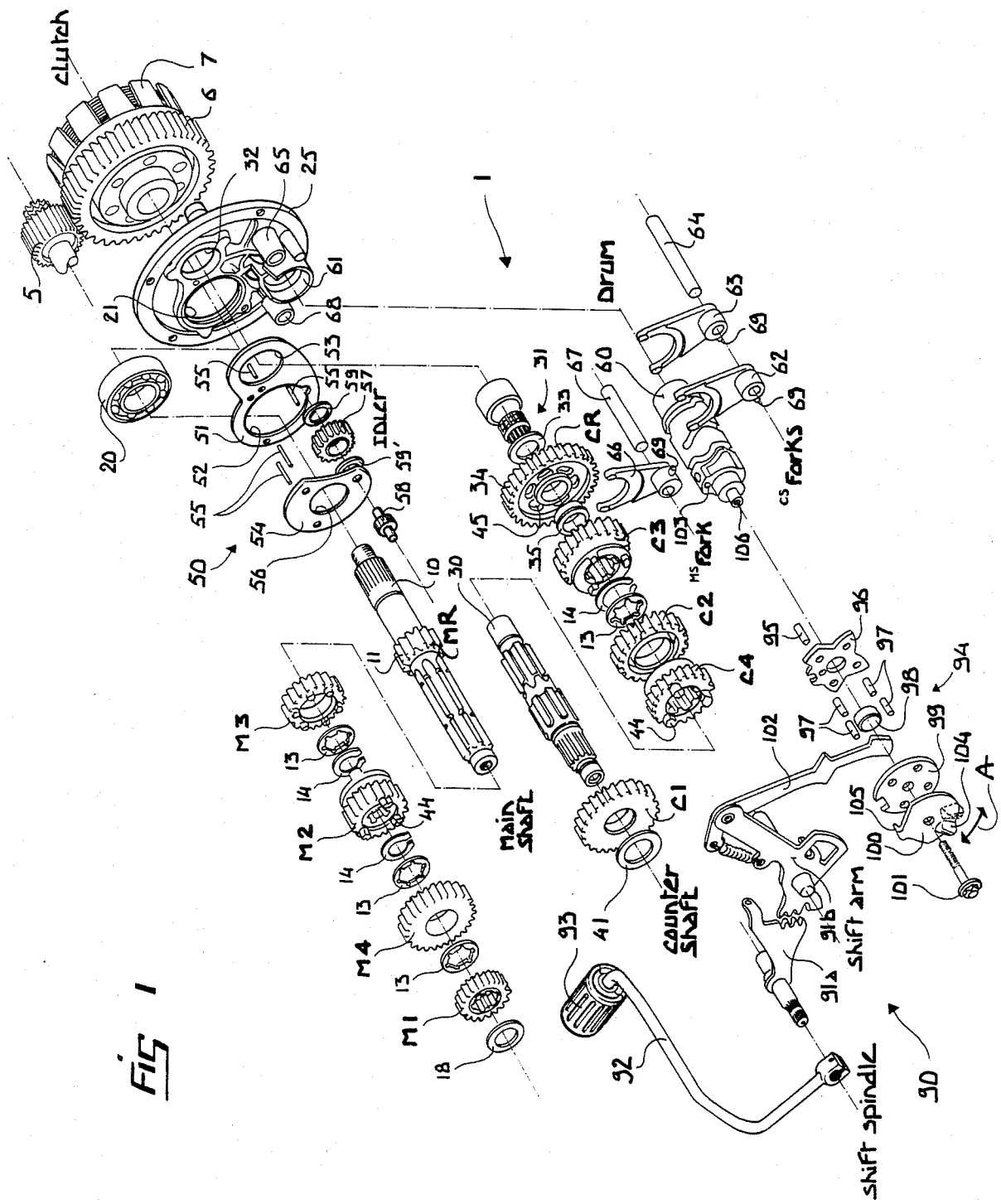
FIG. 1 is an exploded view of the transmission of this invention from the crankshaft output through the countershaft output.
Figure 3:
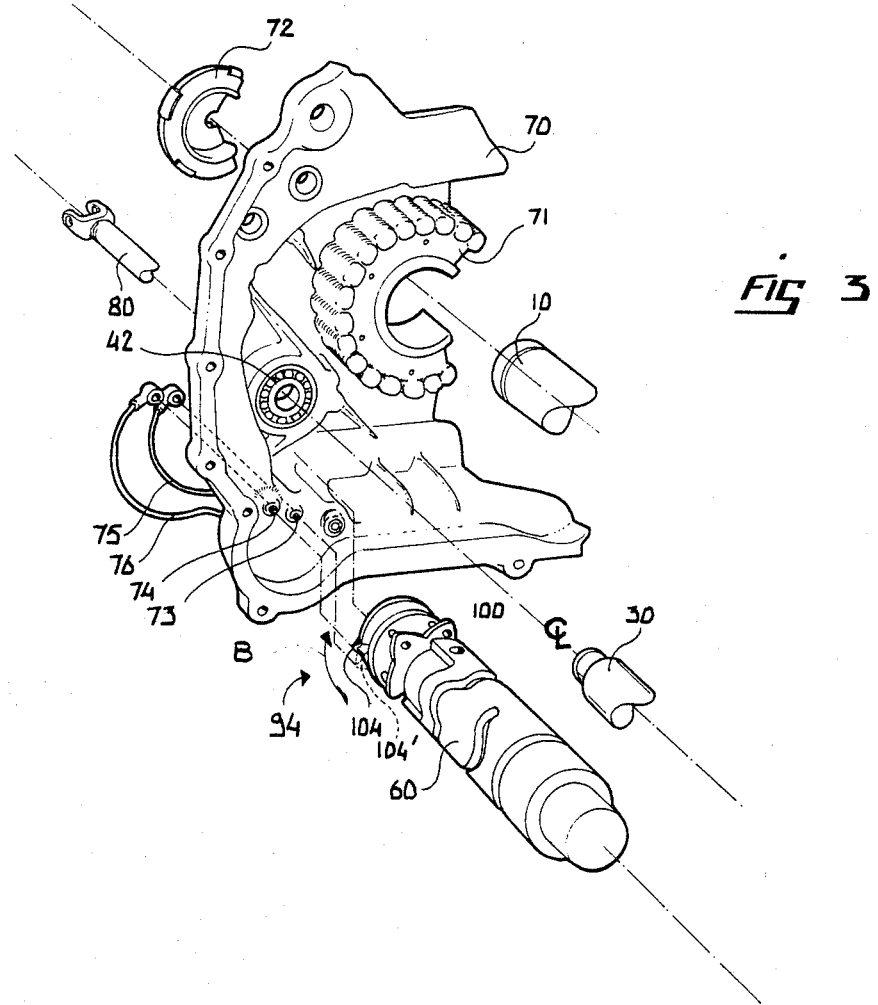
FIG. 3 is an exploded perspective of a portion of the rear engine casing showing the contact assembly and movement to signal reverse gear and back-up warning systems.
Figure 4:
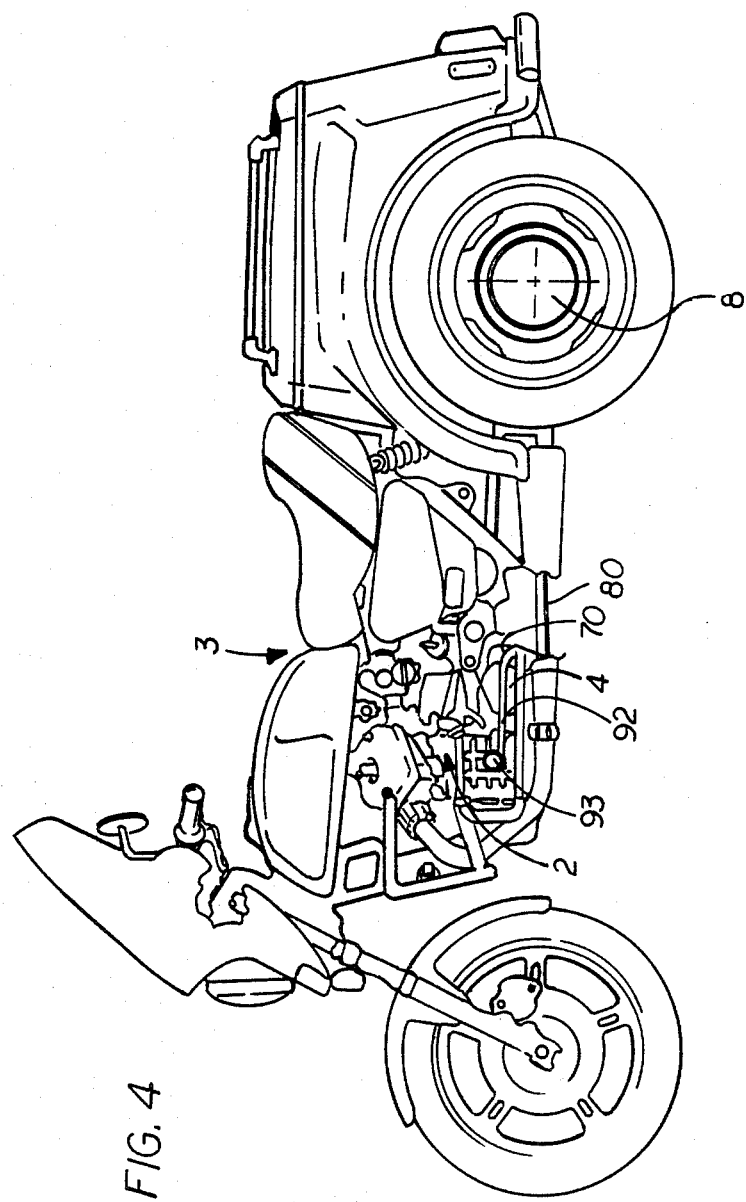
FIG. 4 is a side elevation view of a three-wheel motorcycle employing the transmission of this invention with a small portion broken away to show the drive shaft assembly connected to the transmission assembly.

Turning now to FIG. 1, this figure illustrates in exploded view the four-speed forward constant mesh transmission 1, having an integral positive drive reverse gear in accord with this invention. One of skill in the art will appreciate that this transmission is an in-unit, integral-type transmission located in the lower portion of the engine casing 4, which is only shown in FIG. 4 for the sake of simplicity. The crankshaft output gear 5 provides the basic engine power to the clutch hub transfer gear 6 associated with the multi-plate clutch 7. The main shaft 10 is splined to the transfer gear 6, and is journaled at one end in roller bearing 20, which is press-fit into aperture 21 in transmission front endplate 25. The other end of the main shaft is journaled in the back end of the engine casing 70 shown in FIGS. 3 and 4. The main shaft transfers power through its various gears as described in more detail below to the countershaft 30. The countershaft 30 is journaled at its forward end in needle bearing assembly 31 press-fit into aperture 32 in front gear endplate 25. The countershaft is splined to front drive shaft 80 (FIGS. 3 and 4). This drive shaft may directly drive the rear wheel of a two-wheel motorcycle, or in the alternative as shown in FIG. 4 (and in more detail in our copending application), may be coupled to an automotive-type differentiating rear axle 8 of a three-wheel vehicle 3.

The rotary shift drum 60 is journaled at its forward end in cup 61 in the transmission front endplate 25. A pair of countershaft forks 62, 63 are carried on spindle 64 which is journaled in cup 65 in the transmission front endplate 25. Likewise, a main shaft fork 66 is journaled on its spindle 67 which is received in cup 68 on the transmission front endplate 25.

The gear selector assembly 90, having a rubber toe shift spool 93 on one end of arm 92, is at the other end on shift arm assembly 91a, 91b which actuates shift pawl 102. The pawl engages shift cam plate assembly 94 which rotates the rotary shift drum 60 to cause the shifting of the various gears on the main shaft and countershaft.

Looking in more detail at the reverse gear idler assembly 50, this assembly comprises a frontplate 51 having apertures 52 and 53 for receiving the main shaft bearing and the countershaft bearing, respectively. This frontplate 51 is spaced from a rearplate 54 by a plurality of pins and bolts 55. The rearplate 54 has an aperture 56 for receiving the main shaft 10 therethrough. Disposed to intersect aperture 52 in plate 51 is idler gear 57 mounted on idler pin and needle bearing assembly 58. The idler gear is spaced from the plates 51 and 54 by spacers 59 and 59'. A portion of the shift drum cup 61 in the transmission front endplate 25 adjacent to the main shaft bearing aperture 21 is cut away to provide clearance for the reverse gear idler assembly 50. The idler gear is disposed to be in continuous running contact with the main shaft reverse gear 11 and the countershaft reverse gear 34.

It should be noted that the various shafts, drums and gears have been identified in FIG. 1. The gears are identified as MR for the main shaft reverse gear, M1 for the main shaft first gear, and M2, M3 and M4 for the main shaft second, third and fourth gear, respectively. Likewise, CR is the countershaft reverse with C1 through C4 being first through fourth gears, respectively, on the countershaft. Note that alternate gears in the gear pairs are either free floating or splined. For example, the M3 is free floating while the corresponding C3 is internally splined. Main 2 is internally splined while the C2 is free floating; M1 is internally splined while the C1 is free floating. The Main Reverse 11 is fixed to the main shaft 10 while the Countershaft Reverse 34 is free floating on the countershaft. In addition, a number of splined spacers 13 and locating clips 14 are disposed between the various gears as shown. Main shaft thrust washer 18 is located aft of the main first gear M1 while the countershaft primary thrust washer 41 is located aft of the countershaft first gear C1. Thrust washer 33, located on the countershaft, may either be located fore or aft of the countershaft reverse CR. The reverse gear CR is mounted on reverse gear bushing 35.

FIG. 1 also illustrates dogs, such as dog 44, on the face of various gears which engage their corresponding slots in adjacent gears to lock up the adjacent gears in transferring power from one gear to another. The slots are shown such as slot 45 illustrated by way of example in the countershaft reverse gear CR.

Looking in more detail at the shift cam plate assembly 94, the shift pawl 102 engages a set of four shift pins 97 located in the periphery of a pair of plates, detented cam plate 96 and shift pin locating plate 99. These plates are spaced apart by spacer 98. Detented plate 96 carries cam plate locating pin 95 which is received in hole 103 in the rotary shift drum 60. The aft end of the assembly carries a neutral and reverse gear indicator plate 100 having a contact boss 104 thereon, and a tang 105 which engages plate 99. The entire assembly is held together by a locking bolt 101 which engages the hole 106 in the rotary shift drum 60. As the shift pawl 102 engages the shift pins and detents, the drum 60 is rotated and the follower pins 69 in the fork 62, 63 and 66 follow the various cam grooves in the drum, to shift the gears along the main and countershafts into their appropriate locked-up or floating positions.

Turning now to FIG. 3 before completing the description of the shifting, this figure shows, in exploded perspective, the rear of the engine casing 70 with alternator winding 71 which fits over the aft end of the main shaft 10, which is capped by ignition unit 72. Likewise, the countershaft aft end is journaled in bearing 42 and is connected to the front portion of the drive shaft assembly 80. The rotary shift drum 60 with the shift cam plate assembly 94 on the aft end thereof, is also indicated. The boss 104 on the neutral and reverse gear indicator plate 100 is disposed, as shown in FIGS. 1 and 3, to contact either the neutral indicator switch 73 or the reverse indicator switch 74. These are in turn attached to the appropriate neutral switch lead 75 or the reverse switch lead 76 as shown in FIG. 3. The boss is shown in the upward position with the arrow indicated by the lettering B to show its movement from position 104 to 104' to make contact with the switch contact 73 and 74. The proper position is as shown in FIG. 1 with the arrow A.

When the toe shift lever 92 is actuated such that the engine is in neutral, the boss 104 will contact the neutral indicator switch 73 so indicating neutral on the cycle dashboard. When the engine is shifted into reverse, the boss is moved to position 104' and a reverse gear indicator light, which may be a flashing light, lights up on the dashboard. In addition, a white back-up light on the back of the cycle is turned on to illuminate the area behind. Likewise, a back-up beeper is actuated so that a warning is sounded to any pedestrians or other persons behind the vehicle.

Figure 2:
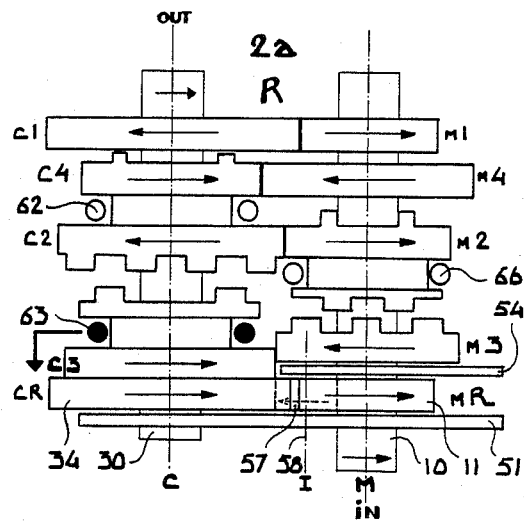
FIGS. 2a-f show schematically the positioning and contact of the gears in the various shift positions: reverse, neutral, first, second, third, and fourth, respectively.
Figure 2:
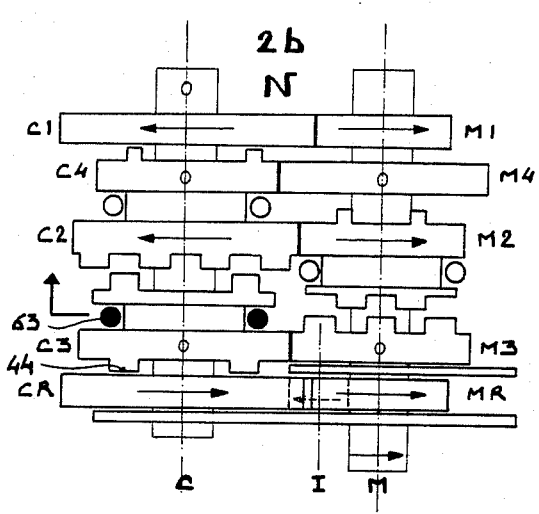
Figure 2:
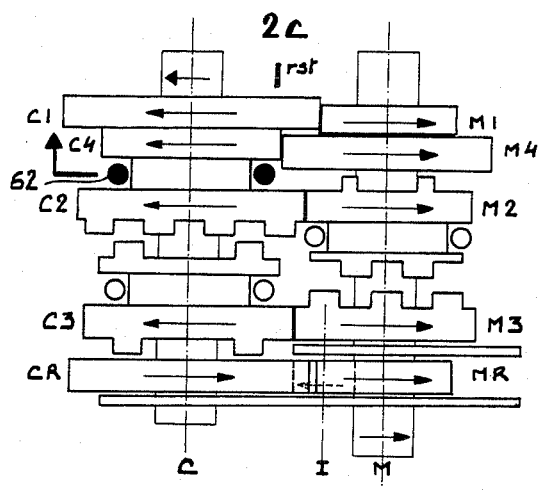
Figure 2:
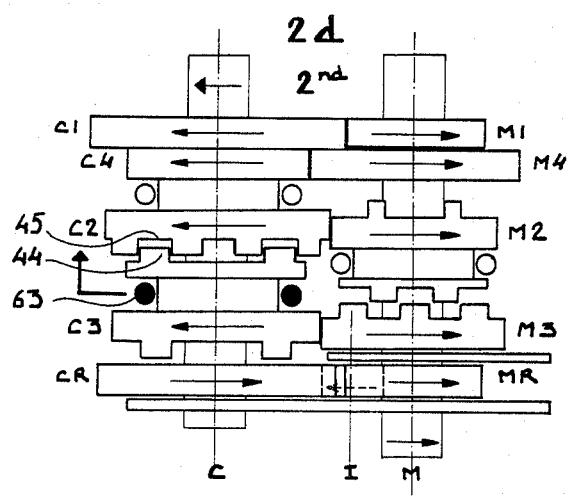
Figure 2:
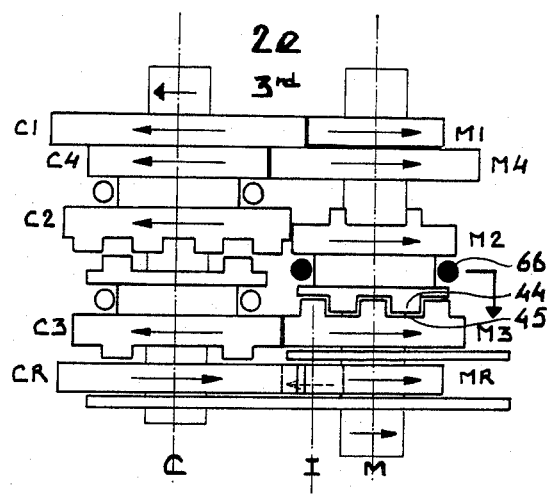
Figure 2:
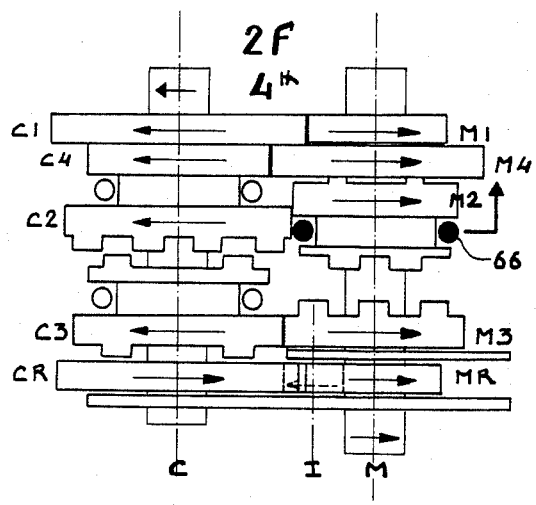

Turning now to FIG. 2, this figure shows in schematic the various shift patterns. Looking first at FIG. 2a, this shows the gearing positions for reverse gear in accordance with this invention. As shown, the engine power is input to the main shaft 10 at the bottom right hand of the drawing. The front endplate of the transmission is not shown. However, the reverse gear frontplate 51 and rearplate 54 are shown with the main reverse MR11, the reverse idler 57 on its pin 58, and countershaft reverse CR34 sandwiched therebetween. It should be noted that the main reverse MR, the idler reverse 57 and the countershaft reverse 34 are in continuous contact at all times. The main reverse and idler reverse are counter rotating, thus the countershaft reverse CR rotates in the same direction as the main reverse.

In this illustration, the main shaft is shown as rotating to the right, but it should be understood that this direction is arbitrary for this position shown and may be rotating in the opposite direction. In that case, the arrows would be reversed throughout these diagrams.

Since the main reverse is rotating to the right, all the splined gears thereon will be rotating in the same direction. This includes the main reverse MR, the main second M2, and the main first M1. The countershaft fork 63 has been actuated to bring the dogs of the countershaft third gear C3 into contact with the slots of the countershaft reverse CR. These are then in locked-up position. The other gears are not locked up as shown by the arms of the fork 62 and 66 being circles rather than solid dots as in the case of the fork 63. The arrow also shows the shifting movement of the fork along the drum 60. Thus, the power is transferred from the main shaft through the main reverse MR, the idler reverse 57 to the free-floating counter-reverse CR. Since the C3 gear (which is splined to the countershaft) is locked up to the CR gear, power is then transferred out the rear end of the countershaft 30, as shown by the arrow to the right on the upper end of the countershaft.

Looking at FIG. 2b, this illustrates the neutral position. Since the fork 63 has separated the counter third C3 so that the dog 44 is no longer is contact with the counter-reverse gear, and the counter-reverse is free floating on the countershaft 30, no power is transmitted to that shaft. Note that the splined gears M1 and M2 cause their corresponding countershaft gears C1 and C2 to counter rotate, but since those latter two gears are free floating, likewise no power is transmitted to the rear output (upper) end of the countershaft.

FIG. 2c shows first gear operation. In this case, the fork 62 has been moved so that the C4 gear dogs contact the slots in the C1 gear. Power is transmitted up the main shaft to the splined M1 gear. It transfers counter-rotating power to the C1 gear. Since it is locked into the C4 gear which is splined to the countershaft, power is then transmitted to the rear output (upper) end of the countershaft. Of course, M4 is counter rotating as are the other paired gears in this constant mesh transmission. Since the C3 and CR gears are not locked in, there is no power transmission through the reverse gearing of this invention.

By the same analysis, the remaining forward gears, second gear shown in 2d, third gear shown in 2c, and fourth gear shown in 2f, can be understood.

In FIG. 2d power is transmitted up the main shaft to the splined M2 gear which is transferred across to the floating C2 gear. Since the fork 63 has been moved, the dogs 44 of the C3 gear are engaged in the slots 45 of the C2 gear, and power is then transmitted to the splined C3 gear. This in turn causes rotation of the countershaft, and power is transmitted to its output end. The direction of rotation is shown by the arrow at the (upper) output end of the countershaft.

In FIG. 2c the power travels up the main shaft to the M2 gear, which is locked-up with the M3 gear. This in turn transmits power to the C3 gear which is splined to the countershaft providing the third gearing power at the (upper) output end.

In FIG. 2f the power is transmitted up the main shaft first to the splined M2 gear which is locked into the free-floating M4 gear. This transfers power to the splined C4 gear which in turn transmits power up the output end of the countershaft.

The "free-floating" gears may also be termed freely rotating or free-wheeling gears, and means a gear that is not adapted to permit direct transfer of power to or from the shaft on which it is mounted.

It should be understood that various modifications within the scope of this invention can be made by one of ordinary skill in the art without departing from the spirit thereof. I therefore wish my invention to be defined by the scope of the appended claims as broadly as the prior art will permit, and in view of this specification if need be.

I claim:

1. In a constant mesh gear train assembly for a motorcycle type engine having a main shaft and a countershaft with a plurality of alternate internally splined and freely rotating forward gears, the improvement which comprises in operative combination:
   (a) a main shaft reverse gear having means for engagement with said main shaft to permit transfer of power between said main shaft and said main shaft reverse gear;
   (b) a countershaft reverse gear mounted to freely rotate on said countershaft, disposed with its gear teeth spaced from the gear teeth of said main shaft reverse gear;

(c) said countershaft reverse gear having means for engagement with at least one adjacent gear mounted on said countershaft;

(d) said countershaft adjacent gear having means for engagement with said countershaft to permit transfer of power between said countershaft and said adjacent gear;

(e) means for selectively shifting said countershaft adjacent gear into engagement with said countershaft reverse gear;

(f) a reverse idler gear having means for maintaining the teeth thereof in continuous rotatable mesh with the teeth of both said main and countershaft reverse gears to transfer power therebetween so that both said main and countershaft reverse gears rotate in the same direction; thereby providing reverse gearing throughout the full range of engine power.

2. A gear assembly as in claim 1 which includes:
(a) at least three forward gears.

3. A gear assembly as in claim 2 wherein:
(a) said shaft means includes means for indicating reverse gear engagement.

4. A gear assembly as in claim 3 wherein:
(a) said indicator means includes an indicator plate having means for selectively engaging an electrical contact when said countershaft reverse gear is in engagement with said adjacent countershaft gear.

5. A gear assembly as in claim 4 wherein:
(a) said electrical contact actuates a reverse dash light, a reverse beeper, and a back-up light.

6. A gear assembly as in claim 5 which includes:
(a) at least four forward gears.

7. A gear assembly as in claim 6 wherein:
(a) said forward gears include first through fourth gears;
(b) said adjacent countershaft gear is a third forward gear splined to said countershaft and meshing with a freely rotating main shaft third gear;
(c) said main shaft third gear is adjacent to said main shaft reverse gear and selectively engageable with an adjacent main shaft second gear;
(d) said main shaft second gear is splined to said main shaft and in engagement with shift means for selectively moving it into contact with said main shaft third gear and an adjacent freely rotatable main shaft fourth gear;
(e) a main shaft first gear splined to said main shaft disposed adjacent said main shaft fourth gear;
(f) said main shaft second, main shaft fourth and main shaft first gears being in meshing engagement with corresponding countershaft second, fourth and first gears;
(g) said countershaft fourth gear being splined to said countershaft and selectively engageable with said countershaft first gear;
(h) means for selectively shifting said countershaft second gear into engagement with said countershaft third gear and said countershaft fourth gear into engagement with said countershaft first gear.

8. A gear assembly as in claim 2 wherein:
(a) said idler gear mesh maintaining means includes an idler shaft on which said idler gear is rotatably mounted.

9. A gear assembly as in claim 8 wherein:
(a) said idler shaft is mounted between a pair of plates securing the ends of said shaft, and having apertures therein for receiving therethrough said main shaft and said countershaft.

10. A gear assembly as in claim 9 which includes:
(a) at least four forward gears.

11. A gear assembly as in claim 10 wherein:
(a) said forward gears include first through fourth gears;
(b) said adjacent countershaft gear is a third forward gear splined to said countershaft and meshing with a freely rotating main shaft third gear;
(c) said main shaft third gear is adjacent to said main shaft reverse gear and selectively engageable with an adjacent main shaft second gear;
(d) said main shaft second gear is splined to said main shaft and in engagement with shift means for selectively moving it into contact with said main shaft third gear and an adjacent freely rotatable main shaft fourth gear;
(e) a main shaft first gear splined to said main shaft disposed adjacent said main shaft fourth gear;
(f) said main shaft second, main shaft fourth and main shaft first gears being in meshing engagement with corresponding countershaft second, fourth and first gears;
(g) said countershaft fourth gear being splined to said countershaft and selectively engageable with said countershaft first gear;
(h) means for selectively shifting said countershaft second gear into engagement with said countershaft third gear and said countershaft fourth gear into engagement with said countershaft first gear.

12. A gear assembly as in claim 2 which includes:
(a) at least four forward gears.

13. A gear assembly as in claim 12 wherein:
(a) said forward gears include first through fourth gears;
(b) said adjacent countershaft gear is a third forward gear splined to said countershaft and meshing with a freely rotating main shaft third gear;
(c) said main shaft third gear is adjacent to said main shaft reverse gear and selectively engageable with an adjacent main shaft second gear;
(d) said main shaft second gear is splined to said main shaft and in engagement with shift means for selectively moving it into contact with said main shaft third gear and an adjacent freely rotatable main shaft fourth gear;
(e) a main shaft first gear splined to said main shaft disposed adjacent said main shaft fourth gear;
(f) said main shaft second, main shaft fourth and main shaft first gears being in meshing engagement with corresponding countershaft second, fourth and first gears;
(g) said countershaft fourth gear being splined to said countershaft and selectively engageable with said countershaft first gear;
(h) means for selectively shifting said countershaft second gear into engagement with said countershaft third gear and said countershaft fourth gear into engagement with said countershaft first gear.

14. A gear assembly as in claim 13 wherein:
(a) said idler gear mesh maintaining means includes an idler shaft on which said idler gear is rotatably mounted.

15. A gear assembly as in claim 14 wherein:

(a) said idler shaft is mounted between a pair of plates securing the ends of said shaft, and having apertures therein for receiving therethrough said main shaft and said countershaft.

16. A gear assembly as in claim 15 wherein:
(a) said shift means includes means for indicating reverse gear engagement.

17. A gear assembly as in claim 16 wherein:
(a) said indicator means includes an indicator plate having means for selectively engaging an electrical contact when said countershaft reverse gear is in engagement with said adjacent countershaft gear.

18. A gear assembly as in claim 17 wherein:
(a) said electrical contact actuates a reverse dash light, a reverse beeper, and a back-up light.

19. A gear assembly as in claim 1 which is disposed in a motorcycle engine crankcase.

20. A gear assembly as in claim 7 which is disposed in a motorcycle engine crankcase.

21. A gear assembly as in claim 11 which is disposed in a motorcycle engine crankcase.

22. A gear assembly as in claim 18 which is disposed in a motorcycle engine crankcase.

23. A motorcycle having an engine in which the gear train is the gear train of claim 1.

24. A motorcycle having an engine in which the gear train is the gear train of claim 7.

25. A motorcycle having an engine in which the gear train is the gear train of claim 11.

26. A motorcycle having an engine in which the gear train is the gear train of claim 18.

* * * * *